United States Patent [19]

Pettijohn

[11] Patent Number: 5,258,343
[45] Date of Patent: Nov. 2, 1993

[54] METAL HALIDE CATALYST, METHOD OF PRODUCING THE CATALYST, POLYMERIZATION PROCESS EMPLOYING THE CATALYST, AND POLYMER PRODUCED BY THE POLYMERIZATION PROCESS

[75] Inventor: Ted M. Pettijohn, Bartlesville, Okla.

[73] Assignee: Phillips Petroleum Company, Bartlesville, Okla.

[21] Appl. No.: 810,734

[22] Filed: Dec. 18, 1991

[51] Int. Cl.$^5$ .................... C08F 4/646; C08F 10/02
[52] U.S. Cl. .................... 502/111; 502/102; 502/113; 502/125; 526/114; 526/348.5
[58] Field of Search .................... 502/111, 113, 102

[56] References Cited

U.S. PATENT DOCUMENTS

| | | | |
|---|---|---|---|
| 3,163,611 | 12/1964 | Andersen et al. | 526/142 |
| 3,429,864 | 2/1969 | Stupp | 260/94.9 |
| 3,642,746 | 2/1972 | Kashiwa | 260/88.2 |
| 3,812,089 | 5/1974 | Tashiro | 260/93.7 |
| 4,330,649 | 5/1982 | Kioka et al. | 526/351 |
| 4,384,087 | 5/1983 | Capshew | 526/119 |
| 4,384,982 | 5/1983 | Martin | 252/429 B |
| 4,524,195 | 6/1985 | Martin | 526/114 |
| 4,525,469 | 6/1985 | Ueda et al. | 526/125 |
| 4,528,339 | 7/1985 | Coleman et al. | 526/142 |
| 4,556,647 | 12/1985 | Yeh et al. | 502/102 |
| 4,575,538 | 3/1986 | Hsieh et al. | 525/244 |
| 4,699,962 | 10/1987 | Hsieh et al. | 526/142 |
| 4,939,217 | 7/1990 | Stricklen | 526/114 |
| 5,028,673 | 7/1991 | Pettijohn et al. | 526/159 |

OTHER PUBLICATIONS

"Study on the NdCl$_3$—supported Ziegler-Natta Catalyst for Olefin Polymerization" Xiao et al., Makromol. Chem. 192, 1059-65 (1991).

Primary Examiner—Edward J. Smith
Attorney, Agent, or Firm—Marianne H. Michel

[57] ABSTRACT

A polymerization catalyst system is formed by producing a solution of a halide of scandium, yttrium, or a rare earth metal and an alcohol; contacting the solution with a halide ion exchanging source to form a solid. The catalyst thus produced can be combined with an organometallic cocatalyst. Polymers with multimodal molecular weight distribution are produced when a diol is used to prepare the catalyst and an organoaluminum halide is used as cocatalyst. Polymers with broad molecular weight distribution of the unimodal type are produced when using a trialkylaluminum compound or an alkyl aluminum hydride.

3 Claims, 2 Drawing Sheets

METAL HALIDE CATALYST, METHOD OF PRODUCING THE CATALYST, POLYMERIZATION PROCESS EMPLOYING THE CATALYST, AND POLYMER PRODUCED BY THE POLYMERIZATION PROCESS

BACKGROUND

The present invention relates to metal halide catalysts.

In the polymerization of alpha-olefins, it is known to use catalyst systems comprising a transition metal compound and an organometallic compound. It is further known that the productivity of such catalyst systems can generally be improved if the transition metal compound is employed in conjunction with a metal halide, such as $MgCl_2$. The catalysts described above produce polymers of narrow molecular weight distribution (MWD) and do not exhibit a multimodal or broad molecular weight distribution.

For many applications, such as extrusion and molding processes, it is highly desirable to have polymers which have a broad molecular weight distribution of the unimodal and/or the multimodal type. Such polymers evidence excellent processability, i.e., they can be processed at a faster throughput rate with lower energy requirements with reduced melt flow perturbations.

It is also highly desirable to produce multimodal or broad molecular weight distribution polymers directly in a single reactor, without having to blend polymers having different molecular weights and distribution in order to obtain the advantages of this invention.

SUMMARY OF THE INVENTION

It is an object of this invention to provide a catalyst system useful for the polymerization of olefins of broad molecular weight distribution.

It is another object of this invention to provide a method to prepare an improved catalyst system useful for the polymerization of olefins.

It is another object of this invention to provide a method for the polymerization of olefins with a multimodal molecular weight distribution in a single reactor.

It is another object of this invention to provide a method for the polymerization of olefins with improved processability.

In accordance with the invention, a catalyst is produced by admixing a metal halide selected from the group consisting of halides of scandium, yttrium, and rare earth metal halides as herein described and an alcohol to form a solution; the thus formed solution is then combined with a halide ion exchanging source.

BRIEF DESCRIPTION OF THE DRAWINGS

The drawings are a graphic representation of the results obtained in the examples.

DETAILED DESCRIPTION OF THE INVENTION

Catalyst

Figure 1:
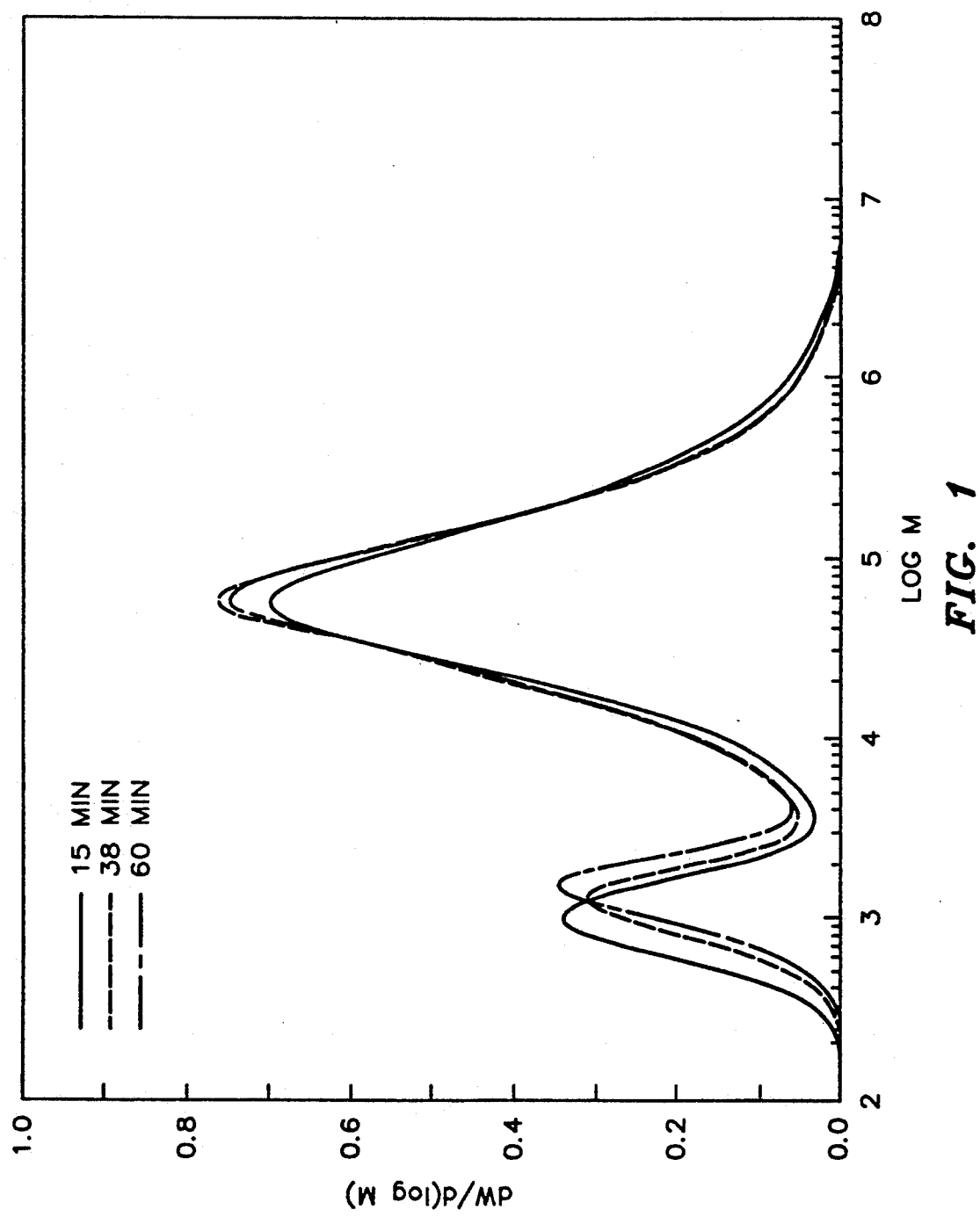
FIG. 1 represents the results in Table 4.

The present invention is concerned with new, high productivity catalysts which employ scandium, yttrium, or rare earth metal halides which are contacted with an alcohol to form a solution; a solid precipitate is formed when the solution is combined with a halide ion exchanging source, and finally an organometal cocatalyst can be used with the catalyst.

The metal halides are employed in the +3 oxidation state in substantially anhydrous form and comprise scandium and yttrium and rare earth elements starting with lanthanum (atomic number 57) and ending with lutetium (atomic number 71) of the Mendeleev Periodic Table. As used herein by the term "Mendeleev Periodic Table" is meant the Periodic Table of the Elements as shown in the inside front cover of Perry, *Chemical Engineer's Handbook*, 4th Edition, McGraw Hill & Co. (1963). Generally, the lanthanide chlorides are preferred because of availability. Examples of preferred compounds include neodymium trichloride, praseodymium trichloride, lanthanum trichloride, yttrium trichloride and mixtures thereof. Neodymium trichloride is particularly preferred because of its efficacy.

Alcohols that can be used include either monohydroxy or polyhydroxy alcohols. Aliphatic or aromatic alcohols can be employed. The aliphatic alcohols can be saturated or unsaturated. Suitable monohydroxy alcohols are those containing 1 to 20 carbon atoms, preferably from 2 to 16 carbon atoms. Examples of suitable monohydroxy alcohols include methanol, ethanol, isopropanol, hexanol, 2-ethyl hexanol, octanol, decanol, dodecanol, and hexadecanol.

Suitable polyhydroxy alcohols include diols and glycerols. Suitable diols are diols containing 2 to 20 carbon atoms, preferably 1,2 diols containing from 2 to 16 carbon atoms. Examples of suitable diols include 1,2-ethanediol, 1,2-propanediol, 1,3-propanediol, 1,4-hexanediol, 1,2-octanediol, 1,10-decanediol, 1,12-dodecanediol, 1,2-hexadecanediol and 1,20-eicosanediol. Diols are especially preferred for producing polymers having multimodal molecular weight distribution.

The alcohol is present in an amount sufficient to form a solution with the metal halide. The amount required to form a solution will vary depending on the alcohol used and the metal halide present.

The moles of alcohol per mole of metal halide to be employed according to the invention is generally in the broad range of about 1 to about 30, preferably in the range of about 2 to about 20, and most preferably in the range of 3 to 15. Examples of amounts of especially preferred alcohols include moles of alcohol per mole of metal halide of greater than 4 when the alcohol is 1,2-hexadecanediol; greater than 5 for 1,2-octanediol; and greater than 10 for 1-octanol.

The metal halide and the alcohol can be combined with a suitable dry solvent or diluent (i.e. one essentially free of water). Typical solvents or diluents include, for example, normally liquid hydrocarbons having 3 to 12 carbon atoms such as n-heptane, methylcyclohexane, toluene, xylenes, and mixtures thereof. Toluene is the preferred solvent.

Generally, the amount of solvent or diluent employed can vary over a broad range. Usually the amount of solvent or diluent per gram of metal halide is within the range of about 5 to 300 grams, preferably in the range of about 10 to about 200 grams and most preferably from 10 to 100 grams.

The temperatures employed in the combination of the metal halide, the alcohol, and solvent can vary over a wide range, generally being in the range of about 0° C. to about 200° C., preferably from about 15° C. to 100° C., and most preferably from 20° C. to 75° C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

The metal halide and alcohol solution is then reacted with a halide ion exchanging source to produce a solid catalyst. The halide ion exchanging source is selected from the halide containing compounds of elements of Groups IVA and VA of the Mendeleev Periodic Table. Further according to the invention, the Group IVA and VA halide containing compounds can be combined with transition metal halides of Groups IVB and VB and organic acid halides. The term halide ion exchanging source is used herein to denote those compounds capable of adding halogen to the solution and promoting the catalytic activity for olefin polymerization.

Currently preferred halide ion exchanging sources include halides of Group IVA and VA transition metals, such as titanium tetrachloride, vanadium oxychloride, zirconium oxychloride, and zirconium tetrachloride, and combinations of Group IVA and VA halides with the halides of Group IVB and VB elements, such as $COCl_2$, $PCl_3$, $SiCl_4$, $SnCl_4$, $CCl_4$ and acid chlorides of the formula $R'COCl$ where $R'$ is an aliphatic or aromatic radical preferably containing 1 to 20 carbon atoms. Particularly preferred halide ion exchanging sources include titanium tetrahalides, e.g. titanium tetrachloride; and combinations of titanium tetrahalides and halogenated silicon compounds, e.g. silicon tetrachloride and trichlorosilane.

The metal halide solution can be contacted with the halide ion exchanging source neat or in a liquid medium. Generally, the metal halide solution is contacted in a liquid diluent containing the halide ion exchanging source. Examples of suitable diluents include n-pentane, n-heptane, cyclohexane, benzene, toluene, and m-xylene.

The temperature employed in contacting the metal halide solution and the halide ion exchanging source is generally in the range of about −25° C. to about 250° C., preferably about 0° C. to about 200° C., and most preferably from 0° C. to 100° C. The pressure employed can vary over a wide range, generally being in the range of about 0 to about 200 psig, preferably in the range of about 0 to about 100 psig, and most preferably in the range of 0 to 50 psig. The time of reaction can vary broadly from about 1 minute to about 72 hours, preferably from about 5 minutes to 24 hours, and most preferably from 5 minutes to 10 hours.

While the moles of halide ion exchanging source per mole of metal halide can be selected over a wide range, generally the range will be from about 0.1 to about 1000, preferably from about 0.5 to about 500, and most preferably from 1 to 100. Following the treatment of the metal halide solution with the halide ion exchanging source to form a solid catalyst, the surplus halide ion exchanging source can be removed by washing with a dry liquid of the type used in the previous step. The resulting product can be stored under dry nitrogen until use.

Cocatalyst

In the polymerization of olefins, the inventive catalyst system can be used with a suitable cocatalyst of the type generally used with titanium-containing olefin polymerization catalysts. Typical examples include organometallic compounds of Groups I, II, and III of the Mendeleev Periodic Table, i.e. alkali metal alkyls or aryls, dialkylmagnesium, dialkylzinc, Grignard reagents, and organoaluminum compounds.

For producing a polymer exhibiting multimodal molecular weight distribution, the preferred organometallic compounds are the organoaluminum halides of the general formula $$R_nAlX_{3-n}$$

wherein R is a hydrocarbyl radical containing 1 to 20 carbon atoms, X is a halogen, preferably chlorine or bromine, and n is 1 to 2. Thus suitable types of organoaluminum halides are selected from dihydrocarbylaluminum halides and hydrocarbylaluminum dihalides, and mixtures thereof.

Examples include dimethylaluminum bromide, diethylaluminum chloride (DEAC), diisobutylaluminum bromide, didodecylaluminum chloride, dieicosylaluminum bromide, ethylaluminum dichloride (EADC), ethylaluminum sesquichloride (EASC), and mixtures thereof. Diethylaluminum chloride is especially preferred. Preferably the organometallic compound has been dissolved in a hydrocarbon solvent. Diethylaluminum chloride is most preferred.

For producing a polymer exhibiting broad molecular weight distribution of the unimodal type, the preferred organometallic compounds are the organoaluminum compounds of the general formula $$R_nAlX_{3-n}$$

wherein R is a hydrocarbyl radical containing 1 to 20 carbon atoms, X is a halogen or hydrogen, and n is 1–3. Examples of suitable organoaluminum compounds are trimethylaluminum, triethylaluminum, diethylaluminum hydride, triisopropenylaluminum, tricyclohexylaluminum, triisobutylaluminum, disobutylaluminum hydride, tridodecylaluminum, trieicosylaluminum, tribenzylaluminum, and mixtures thereof. For the polymerization of monomers consisting predominantly of ethylene, it is currently preferred to use a trialkylaluminum cocatalyst such as triethylaluminum (TEA).

The amount of cocatalyst employed in the catalyst system during the polymerization process can vary widely. Generally, the moles of organometal cocatalyst per mole of halide ion exchanging source in the inventive catalyst system is about 0.1 to about 1000, preferably from about 1 to about 750, and most preferably from 5 to 700.

If desired, the catalyst system can be mixed with a particulate diluent such as silica, silica-alumina, silica-titania, magnesium dichloride, magnesium oxide, polyethylene, polypropylene, and poly(phenylene sulfide), prior to using the composition in a polymerization process. The weight ratio of diluent to catalyst can range from about 0.01 to about 1000.

Reactants

The inventive catalyst system is useful for the polymerization of olefins. Typical polymerizable olefins include the aliphatic monoolefins having 2 to 18 carbon atoms. The term polymerization is used herein to include both homo- and copolymerization. In copolymerization other polymerizable monomers can be employed with the olefins, such as conjugated and nonconjugated dienes.

Suitable olefins include ethylene, propylene, 1-butene, 1-hexene, 4-methyl-1-pentene, styrene, 1,3-butadiene, isoprene, 1,5-hexadiene, trans-1,3-pentadiene, trans-1,3-hexadiene, trans-2-methyl-1,3-pentadiene, trans-3-methyl-1,3-pentadiene, 2,3-dimethyl-1,3-butadiene, trans-trans-2,4-hexadiene and mixtures containing 2 or more polymerizable unsaturated hydrocarbons. A particular group of olefins to be polymerized according to the invention includes unsaturated hydrocarbons having 2 to 6 carbon atoms and having at least one polymerizable ethylenic double bond. The inventive catalyst is particularly well suited for the preparation of ethylene homopolymers and copolymers which contain at least 90 mole percent, and preferably at least 95 mole percent ethylene. In one especially preferred embodiment 99 to 99.6 mole per cent ethylene is used and 0.4 to 1 mole per cent of a 4 to 10 carbon atom comonomer is used; in this embodiment bexene is a particularly desirable comonomer because of cost, availability and efficacy.

The polymerization reaction can be carried out in the presence of a solvent or a diluent. Suitable as the solvent for the instant reaction system are inert hydrocarbons such as n-butane, isobutane, n-pentane, n-bexane, n-heptane, isooctane, cyclohexane, methylcyclohexane, benzene, toluene, xylene, tetralin, decalin, and other aliphatic, alicyclic, aromatic hydrocarbons, or mixtures thereof. The polymerization can be carried out in gas phase in the absence of solvent or diluent.

Polymerization Conditions

The catalyst system of this invention, that is the catalyst and cocatalyst, can be employed in a batchwise, semi-continuous, or in a continuous polymerization process. Generally, the present polymerization reaction can be carried out at a temperature in the range of about 0° C. to about 200° C., preferably a temperature of about 25° C. to about 150° C., and most preferably from 25° C. to 100° C. Polymerization pressure can vary depending on the type of monomer, the catalyst activity, the desired degree of polymerization, etc. Generally polymerization pressure can be subatmospheric or superatmospheric pressure up to about 300 atmospheres, preferably from atmospheric pressure to about 100 atmospheres, and most preferably from atmospheric pressure to 50 atmospheres. Generally contacting time for the catalyst and the olefins can vary broadly from about 1 minute to about one week, more preferably from about 5 minutes to about 24 hours, and most preferably from 5 minutes to 5 hours.

Generally, when using a solvent or diluent in the instant polymerization reaction, it is convenient to introduce olefin into a dispersion containing the catalyst system of the present invention in the solvent or diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, can be added, and the hydrocarbon diluent can then be charged.

The reactor can then be heated to the desired reaction temperature, e.g. about 50° to about 120° C., the ethylene is admitted and maintained at a partial pressure within a range of about 0.5 to about 5.0 MPa (70–725 psig). At the end of the reaction period, generally about 1 hour for bench scale testing, the polymerization reaction is terminated by venting unreacted olefin and diluent. The reactor is then opened and the free-flowing white ethylene polymer can be collected and dried.

In a continuous process, for example, a suitable reactor such as a loop reactor is continuously charged with suitable quantities of solvent or diluent, catalyst, cocatalyst, olefin, and hydrogen, if used. The contact between the catalyst system and monomer can be effected by various ways. For example, the olefin can be contacted with the catalyst in the form of a fixed bed, a slurry, a fluid bed, or a movable bed.

The polymerization reaction can be carried out in the presence of molecular hydrogen to regulate the molecular weight of the olefin polymers, as known in the art.

Products

The reactor product is continuously or intermittently withdrawn, and the polymer recovered, e.g. flashing diluent and unreacted olefin and drying the product. In order to recover a produced polymer from the polymerization system, the crude polymerization product is for example taken up and subjected to flash separation, solvent extraction, hot filtration under a pressure, or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLES

A further understanding of the present invention and its various aspects and advantages will be provided by the following examples. The catalyst systems used in the following examples, unless indicated otherwise, were prepared by charging a solution prepared by combining 1 mole NdCl$_3$ and 5 moles 1,2-octanediol per mole Ti, and toluene to a reactor. TiCl$_4$ was added to the solution, the temperature was raised to 80° C., and the reaction continued for 1 hour. The resulting solid catalyst was recovered, washed, and dried.

In the following examples, unless indicated otherwise, the polymerization reactions were performed in a one liter, stirred autoclave. Prior to the reactions, the autoclave was washed thoroughly with dry cyclohexane and purged with nitrogen. The catalyst was suspended in cyclohexane and charged through a small port under a counter flow of ethylene. The reactor was sealed. Isobutane (500 ml) was added to the reactor and the desired temperature obtained and maintained. Ethylene pressure was increased to a total reactor pressure of 550 psig. At the end of the reaction, solvent and ethylene were rapidly vented and the solid polymer was collected and dried.

The catalyst used in Examples I–V was prepared by combining 1.005 g NdCl$_3$, 2.931 g 1,2-octanediol and 20 mL toluene in a reaction vessel at ambient temperature to form a solution. The rapid addition of 5.0 mL TiCl$_4$ produced an orange-yellow slurry. The reaction mixture was heated at 75° C. for 1 hour then 30 mL chclohexane was added. A yellow slurry was produced. The solid catalyst was washed with cyclohexane then used as a cyclohexane slurry. The concentration of the slurry was determined to be 47 mg catalyst/ml and the catalyst contained 13% Ti by weight.

Polymerizations in Examples I–V, unless otherwise indicated, were run using 7.1 mg catalyst, a temperature of 90° C. for 37.5 minutes, with a partial pressure of hydrogen of 40 psig, a 25 g hexane charge, and 320 moles of diethylaluminum chloride (DEAC) per mole of Ti. Polymers of bimodal molecular weight distribution were produced.

The catalyst used in Examples VI–X was prepared by combining 1.010 g NdCl$_3$, 2.940 g 1,2-octanediol and 20 mL toluene in a reaction vessel at ambient temperature to form a solution. The slow addition of 5.0 mL TiCl$_4$ over a period of about 30 minutes produced an orange-yellow slurry. The reaction mixture was heated at 80°–85° C. for 1.5 hours. Then 30 mL cyclohexane was added. A yellow slurry was produced. The solid catalyst was washed with cyclohexane and then used as a cyclohexane slurry. The concentration of the slurry was determined to be 27 mg catalyst/ml and the catalyst contained 8% Ti by weight.

Polymerizations in Examples VI–X, unless otherwise indicated, were run using 5.0 mg catalyst, a temperature of 90° C. for 37.5 minutes, with hydrogen at a partial pressure of 40 psig, a 25 g hexane charge, and 260 moles of triethylaluminum (TEA) per mole of Ti. Polymers of narrow to broad molecular weight distribution of the unimodal type were produced. Terms used in the tables are defined as follows:

Activity is expressed as grams of polymer per gram of catalyst per hour.
MI is melt index, g/10 minutes, ASTM D1238-65T, conditions E.
HLMI is high load melt index, g/10 minutes, ASTM D1238-65T, condition F.
SR is shear response and is the ratio of HLMI/MI.
Density is g/mL.
HI is heterogeneity index and is the ratio of $M_w/M_n$.
$M_w$ is the weight average molecular weight.
$M_n$ is the number average molecular weight.
Mp(low) is peak molecular weight of low fraction.
WF$_{(low)}$ is the percent weight fraction of the low molecular fraction.
Mp(high) is peak molecular weight of high fraction.
DEAC/Ti is the ratio of moles of diethylaluminum chloride per mole of Ti.
H$_2$ is the partial pressure of hydrogen, $\Delta P(H_2)$, as psig, measured as the pressure drop from a 1 liter vessel.

Hexene is grams of 1-hexene comonomer charged to the reactor.
TEA/Ti is the ratio of moles of triethylaluminum per mole of Ti.

EXAMPLE I

In Example I, a series of polymerization runs was carried out using varyious ratios of diethylaluminum chloride (DEAC) to Ti. The results are summarized in Table 1.

Table I demonstrates that useful catalyst systems are produced by reacting a metal halide, an alcohol, and a transition metal compound in conjunction with an organoaluminum halide cocatalyst. Good catalyst activity for producing polymer with bimodal molecular weight distribution is indicated by the high HI values. As the amount of DEAC is increased, the density, heterogeneity index and the weight fraction of the low molecular weight fraction increase.

EXAMPLE II

Another series of polymerization runs was carried out varying the partial pressure of hydrogen. The results are summarized in Table 2.

Table 2 demonstrates a typical response to increasing amounts of hydrogen, i.e. the melt index and density increase and the molecular weight decreases. Activity of the catalyst appears to decrease somewhat.

EXAMPLE III

Another series of polymerization runs was carried out varying the amount of hexane used as comonomer. The results are summarized in Table 3.

Hexene is incorporated, as indicated by the decreasing density and molecular weight. The peak molecular weight of the low fraction increases and the weight fraction of the low molecular weight fraction increases with increasing hexene.

EXAMPLE IV

Another series of polymerization runs was carried out varying the length of time used in the polymerization reaction. The time in Table 4 is represented in minutes. The results are summarized in Table 4 and FIG. 1.

Table 4 demonstrates the unusual result of increasing molecular weight of the low molecular weight fraction with increasing time. The HI decreases as the molecular weight peaks grow closer together. FIG. 1 also clearly demonstrates the bimodal character of the polymer.

EXAMPLE V

A series of polymerization reactions was run varying the temperature of the polymerization reaction. The results are summarized in Table 5. The total pressure in these runs remains constant, so that as the temperature increases, the amount of ethylene decreases.

Table 5 demonstrates that catalyst activity decreases and weight fraction of the low molecular weight fraction increases with increasing temperature. At 100° C. the activity is decreased considerably.

TABLE I

| DEAC/Ti | Activity | MI | SR | Density | HI | Log MW | M$_p$ (low) | WF (low) | M$_p$ (high) |
|---|---|---|---|---|---|---|---|---|---|
| 110 | 4821 | 0.71 | 25.3 | 0.9482 | 12.40 | 5.0787 | 1844 | 10.23 | 60646 |
| 320 | 8079 | 1.04 | 26.4 | 0.9524 | 22.23 | 5.0785 | 1322 | 17.78 | 58573 |
| 530 | 6883 | 1.78 | 26.5 | 0.9536 | 30.50 | 5.0049 | 1057 | 26.29 | 59350 |

TABLE 2

| H$_2$ psig | Activity | MI | SR | Density | HI | log MW | M$_p$ (low) | WF (low) | M$_p$ (high) |
|---|---|---|---|---|---|---|---|---|---|
| 10 | 8860 | 0.10 | 28.0 | 0.9478 | 30.60 | 5.3160 | 1520 | 16.60 | 78830 |
| 40 | 8079 | 1.04 | 26.4 | 0.9524 | 22.23 | 5.0785 | 1322 | 17.78 | 58573 |
| 70 | 6641 | 5.54 | 30.0 | 0.9551 | 17.00 | 4.8831 | 1095 | 17.77 | 39130 |

TABLE 3

| Hexene | Activity | MI | SR | Density | HI | log MW | M$_p$ (low) | WF (low) | M$_p$ (high) |
|---|---|---|---|---|---|---|---|---|---|
| 0 | 8185 | 0.39 | 27.7 | 0.9588 | 23.43 | 5.2380 | 1111 | 10.47 | 62913 |
| 25 | 8079 | 1.04 | 26.4 | 0.9524 | 22.23 | 5.0785 | 1322 | 17.78 | 58573 |
| 50 | 6375 | 2.09 | 27.0 | 0.9502 | 21.40 | 4.9533 | 1504 | 25.17 | 54330 |

TABLE 4

| Time | Activity | MI | SR | Density | HI | log MW | M$_p$ (low) | WF (low) | M$_p$ (high) |
|---|---|---|---|---|---|---|---|---|---|
| 15.0 | 10496 | 0.71 | 24.0 | 0.9483 | 30.60 | 5.1072 | 1020 | 19.06 | 57920 |
| 37.5 | 8079 | 1.04 | 26.4 | 0.9524 | 22.23 | 5.0785 | 1322 | 17.78 | 58573 |
| 60.0 | 6595 | 1.08 | 28.5 | 0.9534 | 19.05 | 5.0728 | 1545 | 17.45 | 60530 |

TABLE 5

| Temp | Activity | MI | SR | Density | HI | log MW | M$_p$ (low) | WF (low) | M$_p$ (high) |
|---|---|---|---|---|---|---|---|---|---|
| 80° C. | 8968 | 0.31 | 27.0 | 0.9506 | 24.30 | 5.2429 | 1337 | 12.72 | 70310 |
| 90° C. | 8079 | 1.04 | 26.4 | 0.9524 | 22.23 | 5.0785 | 1322 | 17.78 | 58573 |
| 100° C. | 2972 | 15.30 | — | 0.9500 | 18.50 | 4.6613 | 1236 | 43.21 | 42100 |

EXAMPLE VI

Examples VI-X were conducted using TEA as cocatalyst. The polymers produced with TEA as cocatalyst exhibited narrow to broad molecular weight distribution.

Polymerizations in Examples VI-X, unless otherwise indicated, were run using a temperature of 90° C. for 37.5 minutes, with hydrogen at a partial pressure of 40 psig, a partial pressure of hexane of 25 psig, and 260 moles TEA per mole of Ti.

Figure 2:
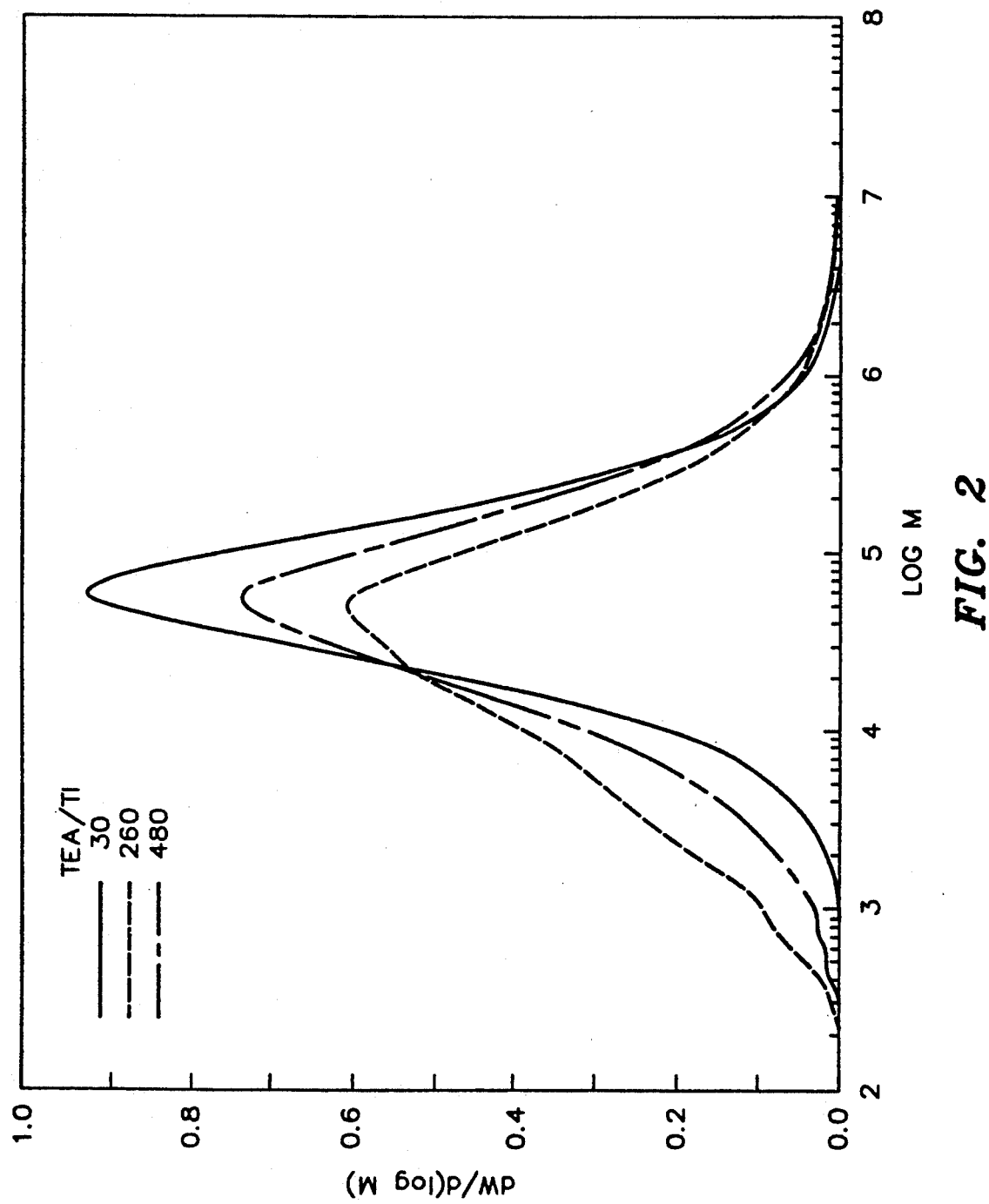
FIG. 2 represents the results in Table 6.

Example VI shows a series of polymerizations using varying amounts of TEA. The results are represented in Table 6 and FIG. 2.

TABLE 6

| TEA/Ti | Activity | MI | SR | Density | HI | log MW |
|---|---|---|---|---|---|---|
| 30 | 17414 | 0.93 | 23 | 0.9455 | 3.85 | 5.0755 |
| 260 | 10313 | 0.87 | 32 | 0.9537 | 8.40 | 5.1105 |
| 480 | 5085 | 1.63 | 45 | 0.9609 | 14.51 | 5.0453 |

Table 6 demonstrates that useful catalyst systems are produced by reacting a metal halide, a diol, and a transition metal compound in conjunction with an organoaluminum cocatalyst. Good catalyst activity for producing polymer with broad molecular weight distribution is indicated by the increasing HI values. Table 6 shows decreasing activity with increasing TEA. Density increases with increasing TEA. In general the HI using TEA is lower than the HI for DEAC.

EXAMPLE VII

In Example VII a series of polymerization runs was carried out using varying amounts of hydrogen. H$_2$ is the partial pressure of hydrogen as psig, measured as the pressure drop from a 1 liter vessel. The results are summarized in Table 7.

TABLE 7

| H$_2$ | Activity | MI | SR | Density | HI | log MW |
|---|---|---|---|---|---|---|
| 10 | 11507 | 0.04 | 44 | 0.9484 | 10.84 | 5.4786 |
| 40 | 10313 | 0.87 | 32 | 0.9537 | 8.40 | 5.1105 |
| 70 | 7136 | 7.15 | 33 | 0.9593 | 7.98 | 4.0250 |

Table 7 demonstrates the effect of hydrogen on the resulting polymer. The results are similar to those using DEAC as cocatalyst. The melt index, and density increase, and the HI, molecular weight, and activity decrease.

EXAMPLE VIII

Another series of polymerization runs was carried out varying the grams of hexene as comonomer charged to the reactor. The results are summarized in Table 8.

TABLE 8

| Hexene | Activity | MI | SR | Density | HI | log MW |
|---|---|---|---|---|---|---|
| 0 | 10026 | 0.28 | 36 | 0.9609 | 11.61 | 5.2945 |
| 25 | 10313 | 0.87 | 32 | 0.9537 | 8.40 | 5.1105 |
| 50 | 8768 | 1.33 | 32 | 0.9494 | 7.93 | 5.0492 |

Table 8 demonstrates that hexene is incorporated into the polymer as indicated by the decreasing density and molecular weight and increasing melt index.

EXAMPLE IX

In Example IX a series of polymerization runs was carried out varying the length of time used in the polymerization reaction. Time is expressed in minutes in Table 9. The results are summarized in Table 9.

TABLE 9

| Time | Activity | MI | SR | Density | HI | log MW |
|---|---|---|---|---|---|---|
| 15.0 | 14336 | 1.47 | 33 | 0.9557 | 10.43 | 5.0531 |
| 37.5 | 10313 | 0.87 | 32 | 0.9537 | 8.40 | 5.1105 |
| 60.0 | 8664 | 0.56 | 32 | 0.9536 | 7.56 | 5.1367 |

TEA is similar to DEAC in its response to time, producing polymers with increasing molecular weight with increasing time.

EXAMPLE X

A series of polymerization reactions was run varying the temperature of the polymerization reaction. The results are summarized in Table 10. The total pressure in these runs remains constant, so that as the temperature increases, the amount of ethylene decreases.

TABLE 10

| Temp | Activity | MI | SR | Density | HI | log MW |
|---|---|---|---|---|---|---|
| 80° C. | 17914 | 0.25 | 29 | 0.9491 | 6.95 | 5.2625 |
| 90° C. | 10313 | 0.87 | 32 | 0.9537 | 8.40 | 5.1105 |
| 100° C. | 2346 | 5.62 | 46 | 0.9602 | 15.23 | 4.9619 |

Catalyst activity and molecular weight decrease with increasing temperature, while the HI and density increase.

Examples I-X demonstrate that useful catalyst systems are produced by reacting a metal halide, an alcohol, and a transition metal compound in conjunction with an organoaluminum cocatalyst. In Examples I-V, good catalyst activity for producing polymer with bimodal molecular weight distribution is exhibited by using DEAC as cocatalyst. In Examples VI-X using TEA as cocatalyst, polymer with broad molecular weight distribution that approaches multimodal molecular weight distribution is produced.

While this invention has been described in detail for the purpose of illustration, it is not to be construed or limited thereby, but is intended to cover all changes and modifications within the spirit and scope thereof.

I claim:

1. A polymerization catalyst system prepared by a process comprising:
   (1) contacting neodymium trichloride with 1,2-octanediol to form a neodymium trichloride solution;
   (2) contacting the solution of (1) with titanium tetrachloride to form a catalyst; and
   (3) contacting said catalyst with diethylaluminum chloride to produce said catalyst system.

2. A process for producing a catalyst system comprising:
   (1) contacting neodymium trichloride with 1,2-octanediol to form a neodymium trichloride solution;
   (2) contacting the solution of (1) with titanium tetrachloride to form a solid catalyst; and
   (3) contacting said catalyst with diethylaluminum chloride to produce said catalyst system;
   wherein said 1,2-octanediol is present in an amount in the range of 3 to 15 moles of alcohol per mole of neodymium trichloride;
   said titanium tetrachloride is present in an amount in the range of 1 to 100 moles of titanium tetrachloride per mole of neodymium trichloride;
   said diethylaluminum chloride is present in the range of 5 to 700 moles of diethylaluminum chloride per mole of titanium tetrachloride;
   wherein said contacting in step (1) is carried out at a temperature of from 20° to 75° C.; and a pressure of 0 to 50 psig; for a time within the range of from 5 to 10 hrs; and
   said contacting in step (2) is carried out at a temperature of from 0° to 100° C.; and a pressure of 0 to 50 psig; for a time within the range of from 5 min to 10 hrs.

3. A catalyst system produced according to the process of claim 2.

* * * * *